May 3, 1927.

W. J. CITRON 1,626,786

FILM ATTACHMENT FOR MOTION PICTURE PROJECTORS

Filed June 25, 1925 2 Sheets-Sheet 1

INVENTOR.
William J. Citron
BY Dewey, Strong,
Townsend & Loftus
ATTORNEYS.

May 3, 1927.  1,626,786
W. J. CITRON
FILM ATTACHMENT FOR MOTION PICTURE PROJECTORS
Filed June 25, 1925  2 Sheets-Sheet 2

INVENTOR.
William J. Citron.
BY Dewey, Strong,
Townsend & Loftus
ATTORNEYS.

Patented May 3, 1927.

1,626,786

UNITED STATES PATENT OFFICE.

WILLIAM J. CITRON, OF SAN FRANCISCO, CALIFORNIA, ASSIGNOR, BY DIRECT AND MESNE ASSIGNMENTS, TO THE TRAILOGRAF COMPANY, INC., OF SAN FRANCISCO, CALIFORNIA, A CORPORATION OF CALIFORNIA.

FILM ATTACHMENT FOR MOTION-PICTURE PROJECTORS.

Application filed June 25, 1925. Serial No. 39,426.

This invention relates to the projection of pictures, reading matter, and the like, by the use of flexible film in the place of the usual plates or slides.

The usual projecting apparatus used in motion picture theaters includes a high-intensity arc lamp carried on a tilting frame which also supports the feed mechanism for a motion picture film. The lamp house is usually mounted so as to slide sideways, so as to be capable of use as a spotlight or in conjunction with a stereopticon slide carrier.

In a prior application, Serial Number 671,888, filed by me October 31, 1923, I have shown and described an attachment for stereopticon lamps wherein I make use of a flexible film instead of the usual plates or slides. In said prior application the attachment as therein constructed is more or less limited in its use to lamps of less light intensity than that obtaining in lamps used for motion picture projecting. Therefore, if applied to the standard type of lamp found in the average projecting room or a theater, there would be grave danger of the film igniting. Not all theaters are equipped with stereopticon lamps, and in order to avoid the expense of a special, low-intensity lamp for projecting the pictures and reading matter on my special film, I have made the present invention. The object of this invention is to provide in conjunction with a film attachment of the character described in my prior application, means whereby the attachment can readily be applied to the usual motion picture projecting apparatus and used in connection with the same lamp which furnishes the light for projecting the motion picture film, special provision being made for absorbing and dissipating the heat from the beam of light so as to eliminate all danger of combustion or ignition when the film is left exposed to the rays of light for a considerable period of time.

One form which my invention may assume is exemplified in the following description and illustrated in the accompanying drawings, in which—

Figure 1:
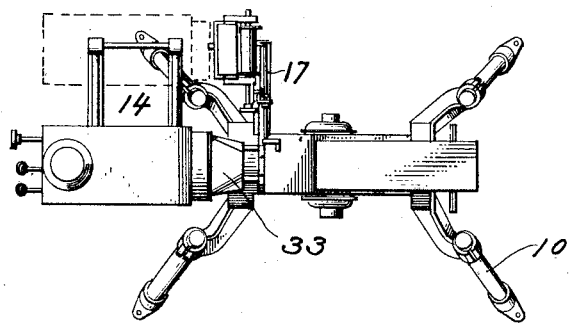
Fig. 1 shows a plan view of a conventional type of motion picture projecting apparatus having my attachment applied thereto.
Figure 2:
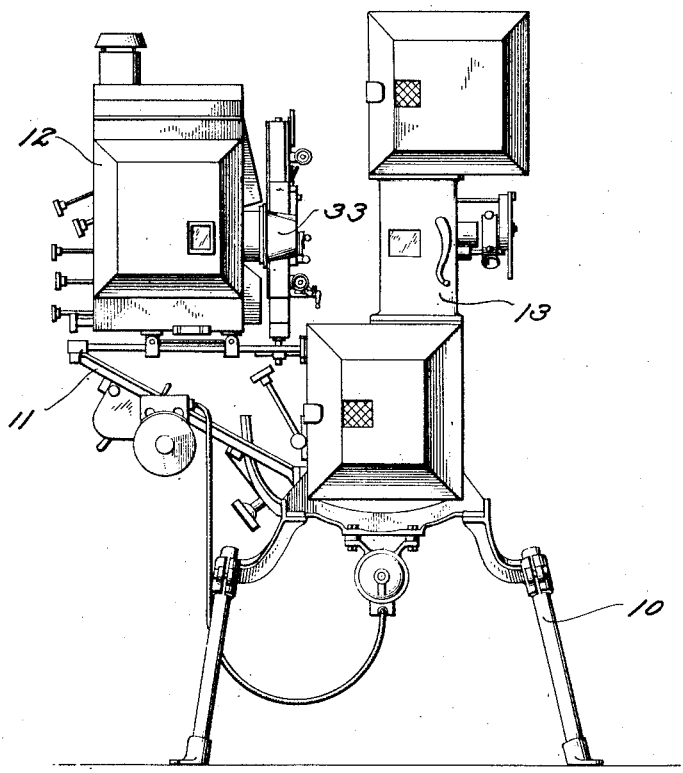
Fig. 2 shows a side elevation of the same.
Figure 5:
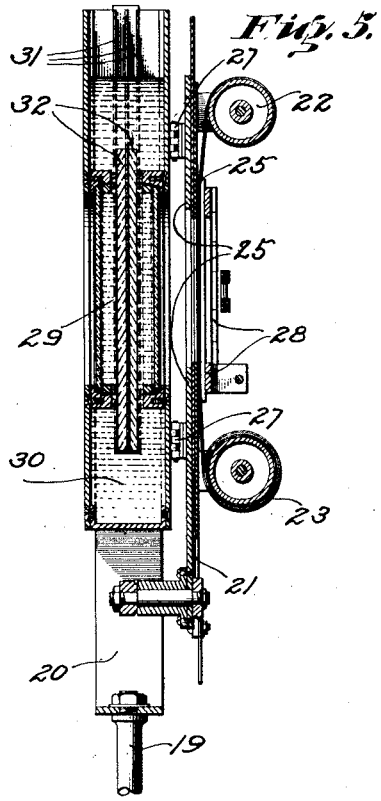
Fig. 5 shows a vertical sectional view of the attachment.
Figure 3:
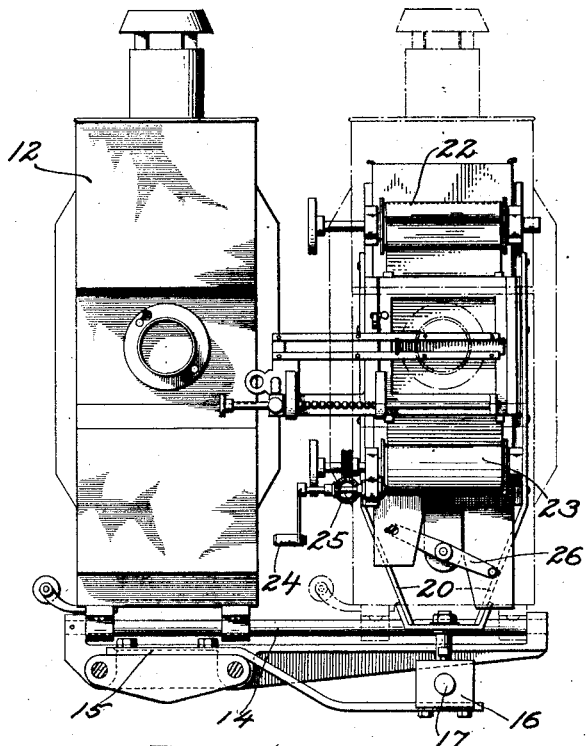
Fig. 3 shows a front elevation of the attachment with the lamp house moved to one side thereof.
Figure 4:
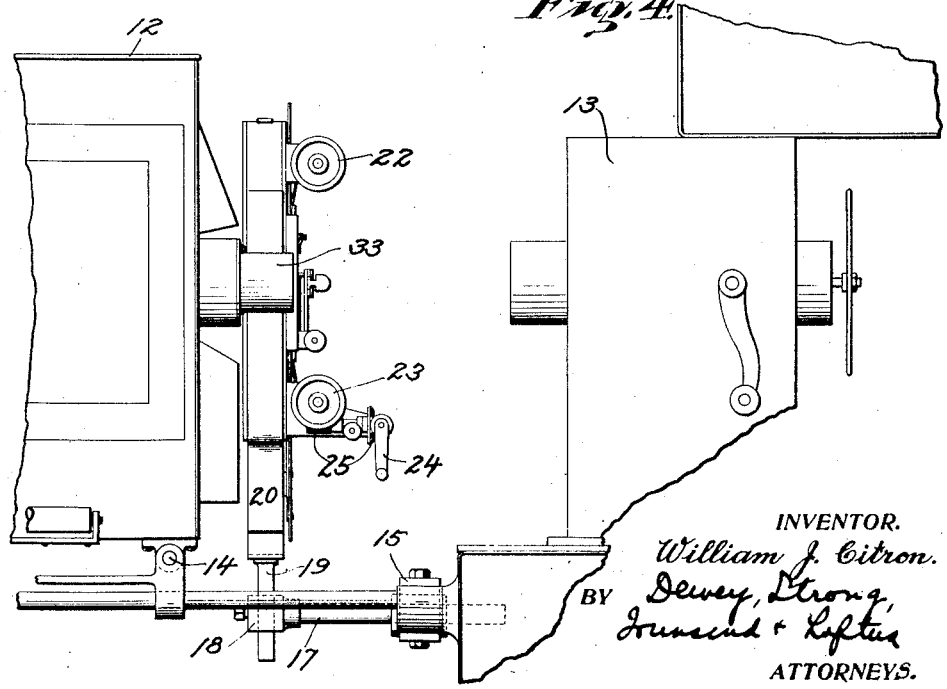
Fig. 4 shows a side elevation of the upper portion of the lamp house and attachment.

The projecting apparatus herein shown includes a stand 10 upon which is mounted a tiltable frame 11. This frame carries at one end a lamp house 12 and at the other end a motion picture feed mechanism 13. The lamp house in addition to being adjustable back and forth towards the motion picture feed mechanism is also movable sideways on the tracks or rods 14. This is the usual construction of the projecting apparatus found in the majority of motion picture theaters.

My attachment includes a bracket 15 secured in any desired manner to the tilting frame 11, preferably at a point between the lamp house and the motion picture feed mechanism, so as not to interfere with the fore-and-aft adjustment of the lamp house. The bracket projects a distance to one side, where it is fitted with a socket 16 to adjustably receive a rearwardly extending rod 17. This rod at its rear end has a socket 18 to adjustably receive a vertically disposed post 19. On the upper end of this post is disposed a frame 20 which carries the film attachment of my prior application. This film attachment includes an apertured plate 21, at the upper end of which is a supply reel 22 and at the lower end of which is a storage reel 23. The latter is fitted with a crank 24 and reducing gear 25 capable of imparting an extremely slow motion to the reel, the reduction being approximately fifty to one, or greater, between the crank and reel. A pair of shutters 25 is provided for the aperture in the plate 21, and these shutters are moved simultaneously in opposite directions by a cross arm 26. The plate 21 is hinged to the frame 20 at 27 so as to swing horizontally. Over the front of the aperture in the plate 21 is a hinged door 28 which serves as a guide for the film.

Supported on the frame 20 back of the plate 21 is a heat-absorbing cell of novel construction. This cell has glass sides or windows 29 in register with the aperture in the plate 21, and is formed with a compartment 30 to contain water. Fitted within the cell are guides 31 to slidably receive one or more plates 32 of ground glass.

This attachment, when applied to a motion picture projecting apparatus and properly adjusted, occupies a position to one side of the motion picture mechanism and to the rear thereof, as shown in Fig. 1. Ordinarily, to slide the lamp house into register with the attachment, it would be necessary to remove the usual hood 33 from the front of the condenser. When the lamp is in alignment with the aperture in the attachment, the latter will function as in my prior application, to project pictures or text on a screen either stationarily or with a slow, continuous movement.

I find that the form of heat-absorbing cell herein shown is capable of absorbing sufficient heat from the high-intensity lamp to prevent burning of the film, even though the latter be allowed to stand in the light rays for an indefinite period of time. By using the ground glass plates within the water cell I find that the plates serve to absorb heat from the rays and transmit such heat to the water, and therefore a smaller cell can be employed, thus making it possible to reduce the size of the cell and provide a compact attachment. By a slight change in the form of the bracket the attachment can be fitted to any of the standard motion picture projecting apparatus now in use.

Having thus described my inventon, what I claim as new and desire to secure by Letters Patent is:

1. In combination, a stand, a kinetoscope thereon, a lamp house on the said stand, said lamp house being fitted with condensing lenses, and a source of illumination of sufficient amperage to project motion pictures, a carrier for inflammable film arranged on said stand, and spaced laterally from and to the rear of the kinetoscope, a film on the carrier printed after the manner of lantern slides, a relatively tall and shallow water cell arranged immediately behind the film carrier, and supported therewith from the stand, said lamp house being shiftable to a position in line with the water cell and associated film, whereby the condensing lens of the lamp house may be brought into close proximity with the film with the water cell between, and the latter functioning to absorb heat to a sufficient degree to permit the film to be held stationary or moved slowly.

2. In combination, a stand, a kinetoscope thereon, a lamp house on the said stand, said lamp house being fitted with condensing lenses, and a source of illumination of sufficient amperage to project motion pictures, a carrier for inflammable film arranged on said stand, and spaced laterally from and to the rear of the kinetoscope, a film on the carrier printed after the manner of lantern slides, a relatively tall and shallow water cell arranged immediately behind the film carrier, and supported therewith from the stand, said lamp house being shiftable to a position in line with the water cell and associated film, whereby the condensing lens of the lamp house may be brought into close proximity with the film with the water cell between, and the latter functioning to absorb heat to a sufficient degree to permit the film to be held stationary or moved slowly, and a ground-glass plate arranged in said cell.

3. In combination with a stand carrying a kinetoscope and a lamp house, an attachment therefor comprising a bracket secured to the stand at one side thereof, a frame adjustably supported in said bracket, a relatively tall and shallow water cell carried by the frame, an apertured film support on the frame in front of the cell, and means for moving an inflammable film across the aperture so as to permit the projection of images thereon with a still or slowly moving effect, said lamp house being movable transversely of the stand, so as to direct its rays through the water cell and associated film.

4. In combination with a stand carrying a kinetoscope and a lamp house, an attachment therefor comprising a bracket secured to the stand at one side thereof, a frame adjustably supported in said bracket, a relatively tall and shallow water cell carried by the frame, an apertured film support on the frame in front of the cell, means for moving an inflammable film across the aperture so as to permit the projection of images thereon with a still or slowly moving effect, said lamp house being movable transversely of the stand, so as to direct its rays through the water cell and associated film, and a ground-glass plate removably arranged in said water cell.

5. In combination with a stand carrying a kinetoscope and a lamp house, an attachment therefor comprising a bracket secured to the stand at one side thereof, a frame adjustably carried by said bracket, a relatively tall and shallow water cell carried by the frame, an apertured film support hinged on the frame in front of the water cell, means for moving an inflammable film across the aperture so as to permit of projection of images thereon with still or slowly moving effects, said lamp house being movable transversely of the stand to a position immediately behind the water cell, so as to direct its rays through said cell and associated film, with the cell functioning to absorb heat so as to permit the film to be held stationary sufficiently long for slow projection of images.

WILLIAM J. CITRON.